US007043373B2

(12) United States Patent
Pittalwala et al.

(10) Patent No.: US 7,043,373 B2
(45) Date of Patent: May 9, 2006

(54) SYSTEM AND METHOD FOR PIPELINE RELIABILITY MANAGEMENT

(75) Inventors: Shabbir H. Pittalwala, Litchfield Park, AZ (US); Daniel J. Wittas, Phoenix, AZ (US)

(73) Assignee: Arizona Public Service Company, Inc., Phoenix, AZ (US)

(*) Notice: Subject to any disclaimer, the term of this patent is extended or adjusted under 35 U.S.C. 154(b) by 179 days.

(21) Appl. No.: 10/841,175

(22) Filed: May 7, 2004

(65) Prior Publication Data

US 2004/0243321 A1 Dec. 2, 2004

Related U.S. Application Data

(63) Continuation of application No. 10/093,620, filed on Mar. 8, 2002, now abandoned.

(51) Int. Cl.
*G01B 3/44* (2006.01)
*G01B 3/52* (2006.01)

(52) U.S. Cl. .......................................................... 702/34

(58) Field of Classification Search ............ 702/33–35, 702/38, 41–44, 81, 82, 84, 182, 184, 185; 73/579, 582, 40, 592; 556/70; 568/8, 16
See application file for complete search history.

(56) References Cited

U.S. PATENT DOCUMENTS

| | | | | |
|---|---|---|---|---|
| 3,414,625 A * | 12/1968 | Lach et al. | .................... | 568/8 |
| 4,611,071 A * | 9/1986 | DePriest | ...................... | 556/70 |
| 5,326,425 A * | 7/1994 | Gedridge, Jr. | .............. | 117/104 |
| 5,540,096 A * | 7/1996 | Woodcock et al. | ........... | 73/579 |
| 6,127,823 A * | 10/2000 | Atherton | ..................... | 324/220 |
| 6,660,874 B1 * | 12/2003 | Shenai-Khatkhate et al. | . | 556/70 |
| 2003/0171879 A1 * | 9/2003 | Pittalwala et al. | ............ | 702/34 |

* cited by examiner

*Primary Examiner*—Michael Nghiem
(74) *Attorney, Agent, or Firm*—Howard I. Sobelman; Snell & Wilmer LLP

(57) ABSTRACT

A system and method is disclosed for facilitating the management of pipeline reliability, maintenance, repair, and/or replacement. Embodiments may be computer-implemented, and may be suitable for prestressed concrete cylinder pipe (e.g., PCCP). Method steps include inspecting the pipe and storing or inputting design and inspection parameters, as well as the maximum expected pressure within the pipe. A relation of pressure versus degradation (e.g., number of broken wires) may be used, which may have zones of risk or classifications corresponding to pipe management actions. The pipe may be analyzed for lack of prestress over various portions of circumference and length. The pipe rupture pressure, crack onset pressure, or can rupture pressure may be analyzed and compared to the expected pressure. The method may be tested and the inspection repeated while tracking changes. The action may involve, for instance, doing nothing, monitoring the pipe, repairing the pipe, or replacing the pipe.

21 Claims, 6 Drawing Sheets

600

SYSTEM AND METHOD FOR PIPELINE RELIABILITY MANAGEMENT

REFERENCE TO RELATED APPLICATIONS

This application is a Continuation of U.S. Ser. No. 10/093,620, now abandoned, filed Mar. 2002, and entitled "SYSTEM AND METHOD FOR PIPELINE RELIABILITY MANAGEMENT",

FIELD OF INVENTION

This invention relates generally to systems and methods for analyzing the reliability and need for replacement of components, and more specifically, to a forecasting tool for a utility network, such as a pipeline network.

BACKGROUND OF THE INVENTION

As used herein, a pipe includes a cylindrical structure or tube that fluids, such as water, oil, or gas, can flow through. Further, also as used herein, a pipeline typically may include a plurality of discrete sections of pipe arranged in series so that the fluid may flow through the pipeline, through each section in turn, for instance, from one end of the pipeline to the other. In addition, as used herein, a pipe system may include a plurality of sections of pipe arranged as needed or desired to perform the intended function of the system. As used herein, a section of, for example, bell and spigot pipe, may be the length from one bell to the next, or may be a greater or lesser predetermined length of pipe.

Pipes may be comprised of, for example, concrete, ductile iron, and/or steel, which may deteriorate due to corrosion, leaching, cracking, and other processes. For example, pipes in industrial cooling water processes and municipal water systems installed over the past 20 to 50 years are aging and the degradation of these pipes may be related to inadequate design, manufacturing defects, improper installation, or simply the pipes approaching the end of their useful life. Such degradation may lead to pipeline or system failures, which may result in costly unplanned outages or down times.

In the past, management techniques for pipelines were typically minimal. In general, pipelines were typically not maintenanced regarding their structural integrity until a failure occurred, at which time either the failed section, or the entire pipeline, would be replaced. Pipelines may have been inspected at planned outages, at which time obvious problems were typically repaired. However, systematic methods of managing pipe, pipelines, or pipe systems were typically not used to anticipate failures and attempt to conduct preventative maintenance or replace the pipe before failure occurs. However, the previous approach of fixing the pipe when it breaks may not be acceptable such as in cases in which a burst pipe may result in damage to property or injury to people, or where loss of the process fluid would have deleterious environmental consequences. Thus, although methods for inspecting pipe for deterioration exist in the art, a pipeline reliability management system and method is needed for such pipelines to increase their reliability and availability for use, and to effectively manage and minimize maintenance, repair, and replacement costs over the long term.

As discussed above, a variety of types of pipe typically exist in the municipal, industrial, and commercial industries, including a concrete pipe which may be precast (e.g., centrifugally cast) such as in bell and spigot construction, or may be cast in place. The pipe is often reinforced with embedded reinforcement steel or rebar, which is typically not significantly stressed when the pipe is not pressurized, or may obtain its structural strength (i.e., ability to withstand internal pressure, from prestressed or post tensioned wires or tendons). Such wires or tendons may be circumfrentially installed or helically wound around the pipe, and may be covered with mortar or another coating or material to protect the wire or tendon from corrosion or other environmental degradation. As examples, pipe may comply with American Water Works Association (AWWA) standard 303 or 304.

For instance, referring to FIG. 1, the pipe may be prestressed concrete cylinder pipe (e.g., PCCP) 100, which may consist of a cylindrical concrete core 105 helically wound with steel wire 111, and coated with mortar 114. The steel wire 111 may be highly stressed in tension when wound around the outer surface 112 of the core 105. For design and pipeline reliability management purposes, the prestressed wire 111 is typically considered to withhold the entire pressure (e.g., hydrostatic pressure) of the contents of the pipe or fluid (e.g., water 106). In other words, the wire 111 holds the hoop stress of pipe 100. Due to the high prestressed tension in the wire 111, the concrete of the core 105 typically remains in compression, thereby minimizing the early development of cracking in the concrete (of core 105) since cracks are more likely to develop when concrete is loaded in tension.

The mortar 114 generally protects the steel wire 111 from corrosion by excluding moisture, and/or oxygen, or by maintaining a high pH. However, since the wire 111 may be so highly stressed, if the wire 111 slightly deteriorates, the wire 111 may break. Experience in the industry has revealed that such wire 111 breaks occur with PCCP, due to, for example, damage to the mortar 114 during installation of the pipe 100, defective wire 111, hydrogen embrittlement of wire 111, inadequate cleanliness of the outer surface 112 of concrete core 105 when the wire 111 is installed, corrosion of wire 111, and other causes, which sometimes cannot be accurately identified. When a wire break occurs, the wire 111 may slightly slip near the break, but friction between the wire 111 and outer surface 112 of concrete core 105, typically prevents the wire 111 from loosening over the entire section of pipe 100. Moreover, even if a certain number of wires were found to be broken, the compression from the adjacent non-broken wires was found to extend over the area of the broken wires. In most applications, one or even several wire breaks may occur without failure of the pipeline; however, if enough wires 111 break, the pipeline may fail.

In the past, despite the presence of the can 107, for PCCP design and pipeline reliability management purposes, the prestressed wire 111 was typically considered to withhold the entire pressure (e.g., hydrostatic pressure and surge) of the contents of the pipe (e.g., water 106). In other words, can 107 was not considered to take any circumferential load or hoop stress. As described above, due to the high tension in the wire 111, the concrete of the core 105 typically was assumed to remain in compression. However, this model often resulted in overly conservative and expensive pipe management practices, which resulted in, for example, the replacing of pipe that could have remained in service for some time.

Various methods have been developed to inspect the various types of pipe in service throughout the world. For instance, the degree of physical degradation or deterioration of the pipeline may be determined by inspection. However, effective and economical inspection may require considerable ingenuity, since the load-bearing component, (e.g., prestressing wire 107) may be located underneath other layers, and the pipeline (e.g., pipe 100) may be buried under the ground. Still, PCCP, as an example, may be inspected in several ways. These ways include, as examples, eddy current inspection, ultrasonic inspection, visual inspection, sounding, and acoustic monitoring.

Eddy current inspection, such as remote field eddy current/transformer coupling (RFEC/TC) testing, provides estimations of broken prestressed wires 111 in PCCP (e.g., pipe 100) and identifies sections of PCCP with no degraded prestressing wires 111. For PCCP with distress, RFEC/TC provides an estimated number of wire breaks and the location of the breaks along the axial length of PCCP.

Ultrasonics or Ultrasonic Testing (UT) is another method of inspection, which has applications beyond PCCP. In fact, UT thickness and defect examination of metallic piping has been used since at least the late 1960s for construction and monitoring of piping systems. For instance, UT is used as a volumetric examination for certain critical welds at nuclear power plants. Power plants (fossil and nuclear) also use UT for erosion/corrosion inspection of high energy process piping lines.

Visual inspection is another option, when access permits, to determine the level of pipeline degradation. Referring once again to FIG. 1, the inside 102 and/or outside 122 of pipe 100 may be visually inspected, and visual inspection may be either direct or remote (e.g., via a camera inserted within pipe 100 to view inside surface 102). Corrosion, spawling, cracking and deflection provide visual indications that piping is in distress.

Sounding is another method of inspecting pipe, which involves tapping on the pipe and listening for the resulting sound. In the recent past, engineers attempted to analyze a pipe for areas of delamination by simplistic manual methods, such as by walking through a pipe and tapping on the inside of the pipe in an effort to hear tone changes which were often indicative of hollow areas within the pipe wall. The engineers often determined that the hollow areas in the pipe wall were areas of concrete failure. When access permits, such sound (impact echo) can be used to determine the level of degradation in pipes.

Sounding may be performed manually (e.g., with a hammer and the human ear) or may also be performed with sophisticated equipment that may provide a consistent impact, record the resulting sound, and display or analyze the frequency response of the sound, rate of attenuation, or other characteristics. However, in order for UT, visual inspection, or sounding to be effective, it may be necessary to uncover the pipe. Even if access to the inside 102 of the pipe is possible, the prestressing wires 111 are typically located far from the inside surface of the pipe, and distress may not show up on surface concrete until failure is imminent. As can be appreciated, uncovering buried pipelines for periodic inspection of the outside 122 may also be cost prohibitive.

Another method of inspection is acoustic monitoring, which was invented by Douglas Buchanan of the U.S. Bureau of Reclamation in the 1990's for use on the Central Arizona Project. Acoustic monitoring involves installing listening devices on or within the pipeline, and monitoring the devices for the sounds generated by the degradation of the pipe. As an example, hydrophones may be installed in water 106 carried by PCCP (pipe 100), which may be monitored by one or more computers or processors, which may be programmed to recognize the sound made by breaking prestressing wires 111. The location of the breaks along the pipe 100 may be determined by comparing the arrival times of the sound at hydrophones on either side of the break. Hydrophones may be installed through taps in the pipe wall (e.g., through core 105) or in a string located within pipe 100.

SUMMARY OF THE INVENTION

The present invention provides, inter alia, a system and method for facilitating the forecasting of pipeline and pipe system reliability to effectively manage maintenance, repair, and replacement costs over the long term. The system and method may be employed in the design, installation, testing, and operational phases of new pipelines, for instance, to maximize service life.

In specific embodiments, the present invention provides a method of facilitating the determination of whether to take pipe management action such as repairing or replacing pipe. The method generally includes (in any order) the steps of: acquiring a first parameter (e.g., a design parameter for the pipe, such as the diameter); inspecting the pipe a first time; acquiring a second parameter (e.g., an evaluation of the structural integrity of the pipe); and acquiring a third parameter (e.g., a pressure within the pipe, which may be the maximum pressure anticipated in future service). The method generally also includes the step of: using at least a relation (e.g., a graph) of the evaluation of the structural integrity of the pipe and the pressure within the pipe, facilitating a determination of whether or not to take pipe management action. When the pipe management action should be taken may also be determined.

The method may also include the steps of: waiting until the next time to inspect; inspecting the pipe a second time; and acquiring a fourth parameter (e.g., another evaluation of the structural integrity of the pipe taken at a later time). The degradation rate of the pipe may be calculated, (e.g., from the difference in the structural integrity of the pipe from the first time the pipe was inspected to the second time it was inspected). In the alternative, the degradation rate may be assumed, (e.g., from prior experience). Whether assumed or calculated for the particular pipe or section of pipe, the degradation rate may be used, for instance, to calculate when the pipe should be, for example, repaired or replaced.

In an exemplary embodiment, the pipe may be prestressed concrete cylinder pipe, and the second parameter may include a quantity of broken wires. The inspecting may utilize, as examples, eddy current inspection, ultrasonic inspection, visual inspection, or sounding (or a combination thereof). The pipe management action may involve, as examples, repairing, replacing, or monitoring the pipe.

The relation or graph may be either physically-viewable or embedded within a computer or computer program (e.g., in a computer implemented method), and may have a plurality of zones of risk (e.g., high and low risk). As an example, in the case of PCCP, the graph or relation may include the anticipated maximum pressure within the pipe versus the number of failed prestressing wires discovered during inspection. The method may further be tested over time to verify that it works.

In another embodiment, the present invention further provides a system for facilitating a determination of whether to take pipe management action. The system generally includes a relation of pressure versus a quantification of the degradation of the structural integrity of the pipe. Similar to as described above for the method, the relation may be either a physically-viewable graph or embedded within a computer, such as an algorithm, data, or a combination thereof.

The relation may have a zone of higher risk and a zone of lower risk, and may also have a zone of medium risk.

The pipe for which the system is used may have a concrete core, and may be prestressed concrete cylinder pipe. Thus, the quantification of the degradation of the structural integrity of the pipe may include a quantity of broken wires. The quantity of broken wires may be, for example, an actual number of contiguous broken wires, a length of pipe wherein all wires are broken, or an equivalent length of pipe where in actuality not all contiguous wires are broken. Further, the pressure that is used may be maximum anticipated pressure (e.g., within the pipe). The relation (e.g., a graph) may further include the anticipated pressure for the ultimate strength of the cylinder, the anticipated rupture pressure of the pipe, or even the pressure anticipated to cause the concrete core to crack. The relation may even further include an action pressure, which may be less than the anticipated rupture pressure of the pipe, but greater than the pressure anticipated to cause the concrete core to crack.

The present invention even further provides a method of facilitating the management of a pipeline. In this embodiment, the pipeline may include a plurality of sections of prestressed concrete cylinder pipe. The method may include in any order the steps of storing design data (e.g., one or more dimensions, external loading, etc.) for each of the sections, inspecting a plurality of the sections (e.g., evaluating the quantity of failed wires within the sections), and estimating the maximum pressure that is likely to exist within the sections in future service. The method may also include using the design data, the quantity of failed wires, and the maximum pressure to designate a classification for the condition of the sections of pipe, and implementing pipe management action based on these classifications.

The inspecting may be repeated at different times, and changes in the quantity of failed wires may be tracked over time. In addition, there may be two, three, or more classifications, and each classification may have a corresponding action. Furthermore, the method may include the steps of calculating the rate of wire failures for the sections, and predicting when the sections will enter another classification.

The pipe management action that is taken (e.g., corresponding to a classification) may be, for instance, doing nothing to the section (at least until the next inspection), monitoring the section, repairing the section, or replacing one or more sections. In some embodiments, sections may be repaired individually until the pipeline deteriorates to the point that it is advantageous to replace the entire pipeline.

The method further may include the step of analyzing one of the sections for lack of prestress pressure over the section's entire circumference, but over a limited length of the section. The sections may also be analyzed for lack of prestress pressure over just a portion of the section's circumference, and over a limited length of the section. The sections may even further be analyzed for lack of prestress pressure over a first limited length of the section, and over a second limited length of the section, where there is a segment of pipe with intact prestressed wire located between the first limited length and the second limited length. The segment may be, for example, more than 3-inches long, but less than 25-inches long, and an effective length of failed wires may be used, which may be calculated as a function of the two limited lengths of failed wires and the length of the segment in between.

The method further may include the steps of analyzing the rupture pressure of the sections, and designating a classification based on whether the maximum pressure exceeds the rupture pressure. Whether the maximum pressure exceeds the rupture pressure of the section by more than a predetermined non-zero amount, may also be determined. In addition, crack onset pressure may be analyzed, and whether the maximum pressure exceeds the crack onset pressure may be determined. Even further, an action pressure may be determined, which may be less than the rupture pressure of the section, but may be greater than the crack onset pressure. Thus, the step of designating a classification may include determining whether the maximum pressure is greater than or less than the action pressure of the section. The designating a classification may also include determining whether the maximum pressure is less than the rupture pressure of the cylinder or can.

The present invention still further provides a computer implemented system for facilitating a determination of whether to take pipe management action. The system generally uses a processor that is configured to acquire or input one or more design parameters (e.g. the diameter of the pipe), input one or more inspection parameters (e.g. information indicating the degradation of the structural integrity of the pipe, such as a quantity of broken wires in PCCP, that may be determined via eddy current inspection), and input the pressure within the pipe (e.g. the maximum pressure anticipated in future service). The system generally uses at least a relation of these parameters (e.g. the number of broken wires v. pressure) to output information to facilitate determining whether or not to take pipe management action (e.g. to recommend whether or not to repair, replace, or monitor the pipe). In some embodiments, information indicating the degradation of the structural integrity of the pipe may also be determined again at a later time, and the change in the structural integrity may be used to calculate the degradation rate of the pipe. Further, when to take pipe management action may also be output, (e.g. using the degradation rate of the pipe).

BRIEF DESCRIPTION OF THE DRAWINGS

The present invention is illustrated by way of example and not limitation in the accompanying figures, in which like reference numbers indicate similar elements, and in which.

DETAILED DESCRIPTION OF EXEMPLARY EMBODIMENTS

Figure 1:
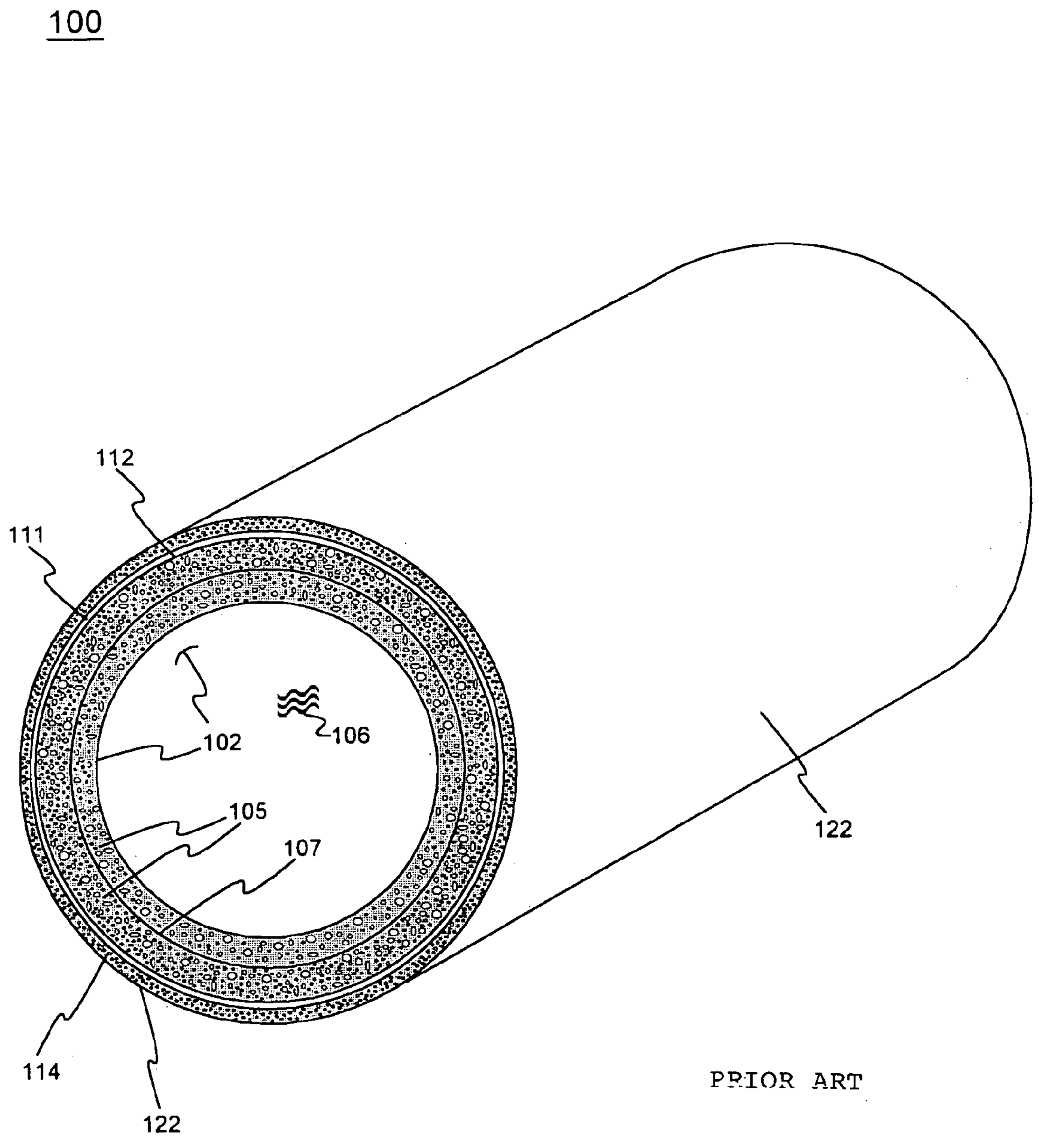
FIG. 1 is an orthographic projection of a section view of prestressed concrete cylinder pipe, showing typical layers in the wall of such pipe.

The present invention includes systems and methods for analyzing the reliability and replacement of components, and more specifically, to a forecasting and reliability management tool for a utility network, such as a pipeline network or pipe system. As such, while the system and methods shall be described in relation to a pipeline or pipe system, one skilled in the art will appreciate that much of the functionality is applicable to other components, utilities, networks and/or the like. For example, at least certain aspects of the present system and method may be applied to any portion of roads, canals, sewer systems, power lines, railroad tracks, buildings, circuits, fences, walls or any other system with components that may fail or degrade. The present invention may also be applicable to heat exchanger tube inspections and monitoring pipelines for erosion or corrosion.

In this regard, the present invention may be described herein in terms of functional block components and various processing steps. It should be appreciated that such functional blocks may be realized by any number of hardware, firmware, and/or software components configured to perform the specified functions. For example, the present invention may employ various integrated circuit components, such as memory elements, digital signal processing elements, look-up tables, databases, and the like, which may carry out a variety of functions under the control of one or more microprocessors or other control devices. Such general techniques and components that are known to those skilled in the art are not described in detail herein.

It should further be understood that the exemplary process illustrated may include more or less steps or may be performed in the context of a larger processing scheme. Furthermore, the various flowcharts presented in the drawing figures are not to be construed as limiting the order in which the individual process steps may be performed.

As a general overview, the present invention provides a system and method for managing or facilitating the management of pipe, pipeline, or pipe system reliability, for example, to increase the reliability of a pipeline and availability for use, and to effectively manage actions that may be taken such as maintenance, repair, and replacement, and their costs (e.g., over a longer term). Embodiments include a system and method that may be employed in the design, installation, testing, and operational phases of new or existing pipelines or pipe systems, for instance, to maximize service life or minimize life cycle costs. Many embodiments are computer-implemented, and comprise, inter alia, a method of forecasting, managing or determining whether or when to take pipe management action such as to repair or replace prestressed concrete cylinder pipe (e.g., PCCP). Various embodiments include steps such as inspecting the pipe and storing or inputting various parameters, such as design parameters, inspection parameters, and environmental parameters. Inspection may involve, for instance, eddy current inspection, ultrasonic inspection, visual inspection, sounding, or some combination of these. Embodiments may also include acquiring or inputting the maximum pressure (e.g., expected within the pipe) and determining whether or not to repair or replace the pipe, and in some embodiments, whether or not to monitor the pipe.

In general, various embodiments may use a relation or graph of pressure versus a quantification of the structural integrity or degradation of the structural integrity of the pipe, wherein the degradation of the structural integrity of the pipe may include, for instance, the number of broken prestressing wires in PCCP or the degree of wall thinning in other pipes. As would be apparent to a person skilled in the art, the structural integrity of the pipe and the degradation of the structural integrity of the pipe are usually related. For instance, the structural integrity of the pipe may be the number of wires that are intact, while the degradation in the structural integrity may be the number of wires that are broken. Thus, as the terms are used herein, a relation or graph that involves the structural integrity of the pipe also generally includes the degradation of the structural integrity of the pipe, and vice versa.

The relation or graph may have zones of high, medium, and low risk and may show the pressure for the ultimate strength of the cylinder (in the case of PCCP). The method may also include designating a zone of risk or classification for the condition of the pipe, and implementing pipe management action based on the classification. The pipe may be analyzed for lack of prestress pressure over various portions of the pipe's circumference and length. The method may also include analyzing the rupture pressure of the pipe, the crack onset pressure, or the rupture pressure of the cylinder (of PCCP) alone, each of which may be compared to the maximum pressure anticipated within the pipe. The method may further include the steps of testing the method over time to verify that it works or repeating the inspection at different times, and tracking changes in the quantity of failed wires. The action may involve doing nothing (at least until the next inspection), monitoring the pipe, repairing the pipe, or replacing the pipe.

More particularly, embodiments of the present invention may provide a system and method of facilitating the determination of whether to take pipe management action such as repairing or replacing pipe. The system or method may be used for pipeline or pipe system reliability management, which may include manual mapping, automation and/or analysis facilitated through a computer or processor.

Figure 2:
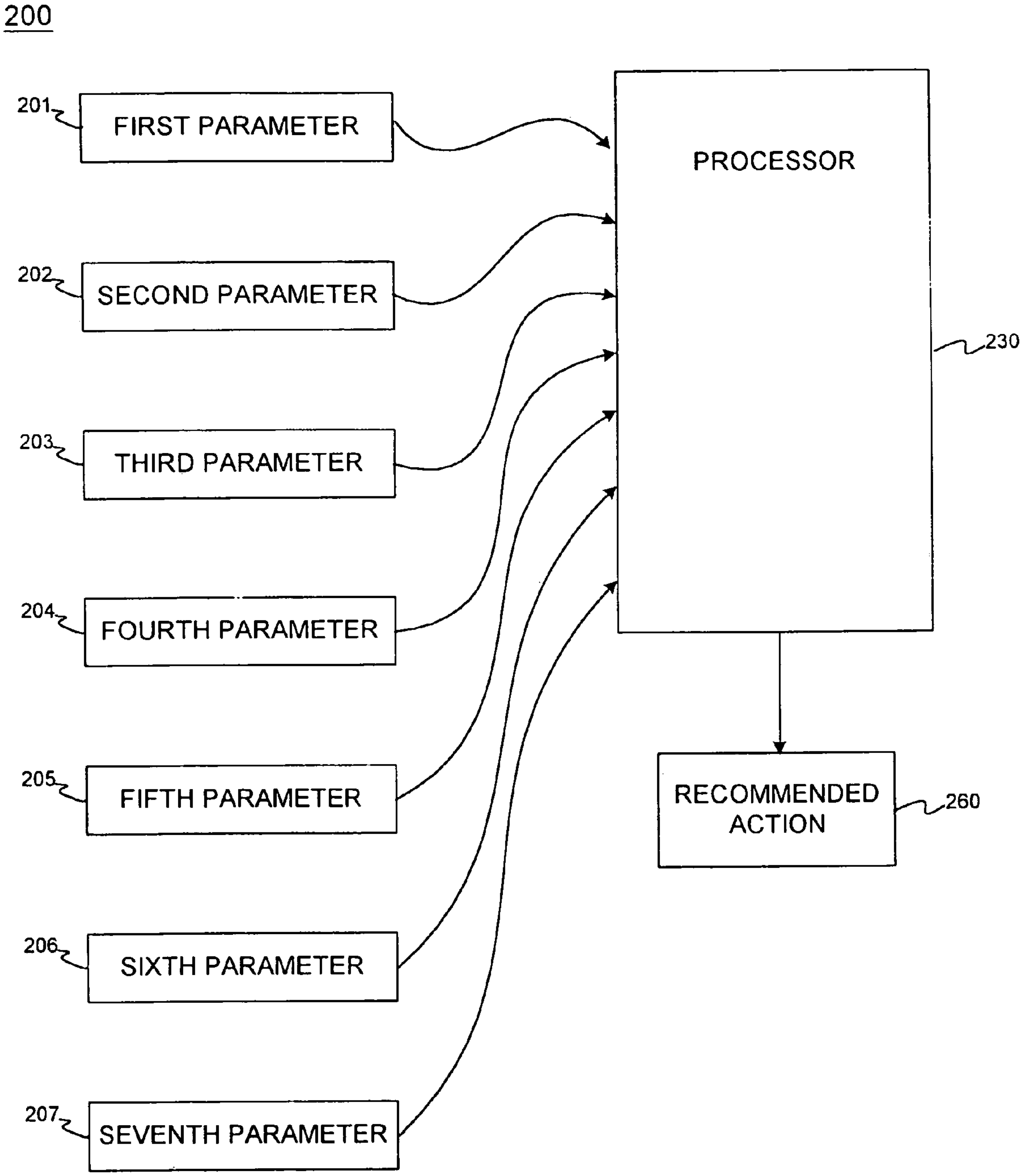
FIG. 2 is a block diagram illustrating a system in accordance with the present invention.

With respect to system components, FIG. 2 is a block diagram illustrating an exemplary system in accordance with the present invention. More particularly, FIG. 2 illustrates in an exemplary embodiment, a computer implemented system 200 for facilitating a determination of whether to take pipe management action, for instance, determining the next action for the management of a pipeline. The system 200 generally uses a computer or processor 230 that is configured to receive or input various parameters (e.g. first parameter 201, second parameter 202, etc.). Seven inputs or parameters are shown (first parameter 201 through seventh parameter 207); however, fewer or more parameters could be used as would be apparent to a person of ordinary skill in the art. Parameters 201–207 may include one or more design parameters (e.g. the diameter of pipe 100), one or more inspection parameters (e.g. information indicating the degradation of the structural integrity of the pipe, such as a quantity of broken wires in PCCP, that may be determined, for instance, via eddy current inspection), and the pressure within pipe 100 (e.g. the maximum pressure anticipated in future service). Processor 230 is generally configured to receive these inputs, which are described in more detail below.

In the exemplary embodiment shown, processor 230 is configured to analyze the input parameters (e.g., some or all of parameters 201–207) and output recommended action 260, which may include a mapping function and/or a recommended action ranging from, for instance, doing nothing to repairing or replacing pipe 100 (e.g., pipe management action as described herein). To determine the recommended action 260, processor 230 may use a relation of at least some of parameters 201–207 (e.g. the degradation of the structural integrity of pipe 100 or the number of broken wires 111 v. pressure). This relation (described in more detail with reference to FIG. 4 below) may be used to determine and output via recommended action 260, information configured to facilitate determining whether or not to take pipe management action, or which pipe management action to take.

Still referring to FIG. 2, in some embodiments of the present invention, information indicating the degradation of the structural integrity of pipe 100 may be determined again at a later time, and processor 230 may be configured to use the change in the structural integrity to calculate the degradation rate of pipe 100. Further, processor 230 may be configured so that recommended action 260 includes when to take pipe management action, which may be calculated (e.g. by processor 230), as an example, using the degradation rate of pipe 100. Output (e.g. recommended action 260) may be tabular or graphic, and processor 230 may be programmed to provide numerical data or graphic information. In addition, as would be apparent to a person of skill in the art, although system 200 shows a processor 230, some or all of the functions or analysis performed by processor 230 could also be performed manually.

In systems (such as system 200 illustrated in FIG. 2) utilizing a computer, the system may include a host server or other computing systems, including, as examples: a processor for processing digital data; a memory coupled to the processor for storing digital data; an input digitizer coupled to the processor for inputting digital data; an application program stored in the memory and accessible by the processor for directing processing of digital data by the processor; a display coupled to the processor and memory for displaying information derived from digital data processed by the processor; and a plurality of databases, which may include input data, historical data, specification data and/or like data that could be used in association with the present invention. As those skilled in the art will appreciate, user computer will typically include an operating system (e.g., Windows NT, 95/98/2000, Linux, Solaris, etc.) as well as various conventional support software and drivers typically associated with computers.

Similarly, the software elements of the present invention may be implemented with a spreadsheet or computer program such as Excel or Dbase. In addition, a programming or scripting language may be used such as C, C++, Java, COBOL, assembler, PERL, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, Solaris, ArcSoft (GIS) or the like.

The database may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access by Microsoft Corporation (Redmond, Wash.), or any other database product. The database may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

Figure 3:
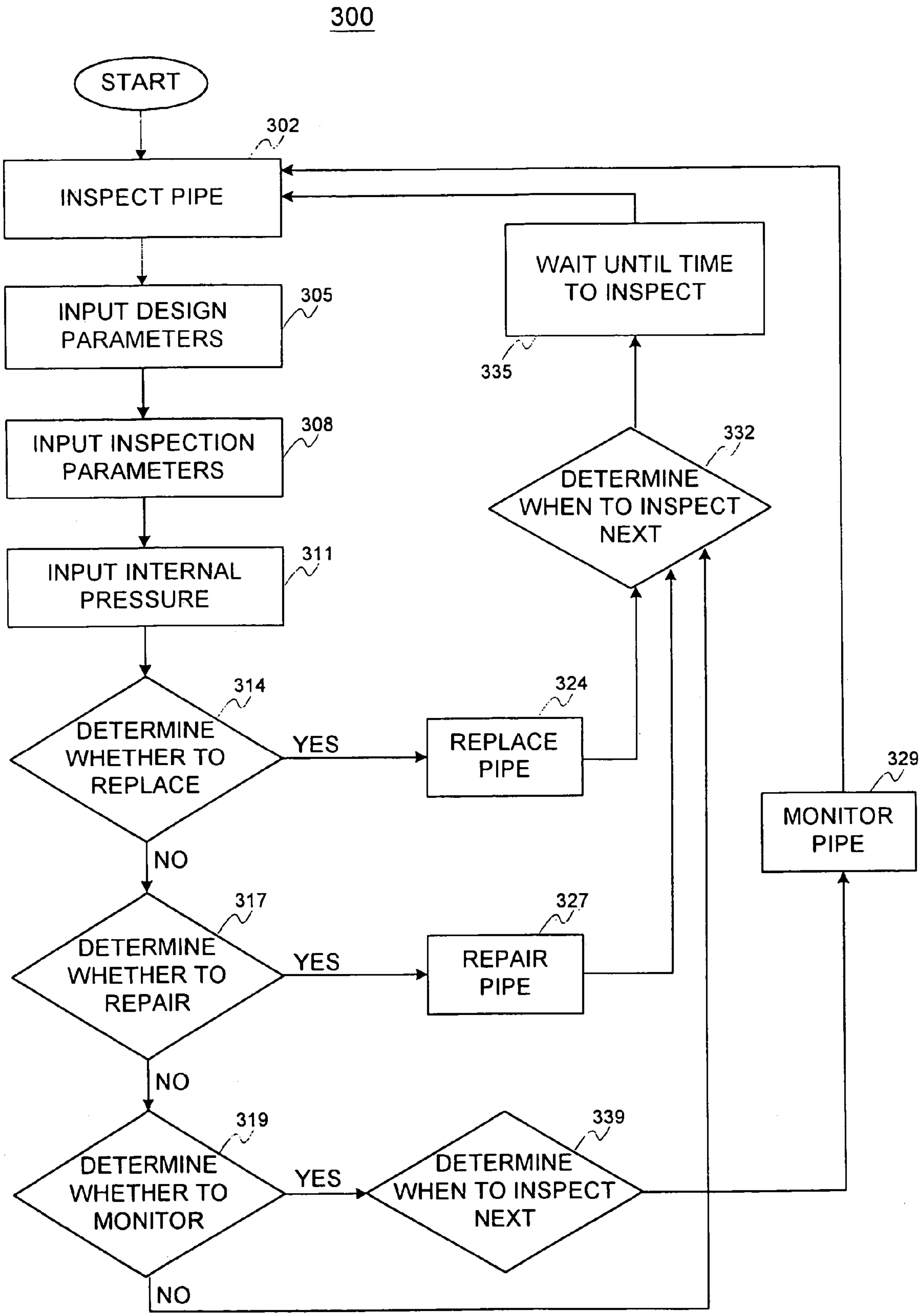
FIG. 3 is a flow chart illustrating the steps of one exemplary embodiment of a method in accordance with the present invention.
Figure 5:
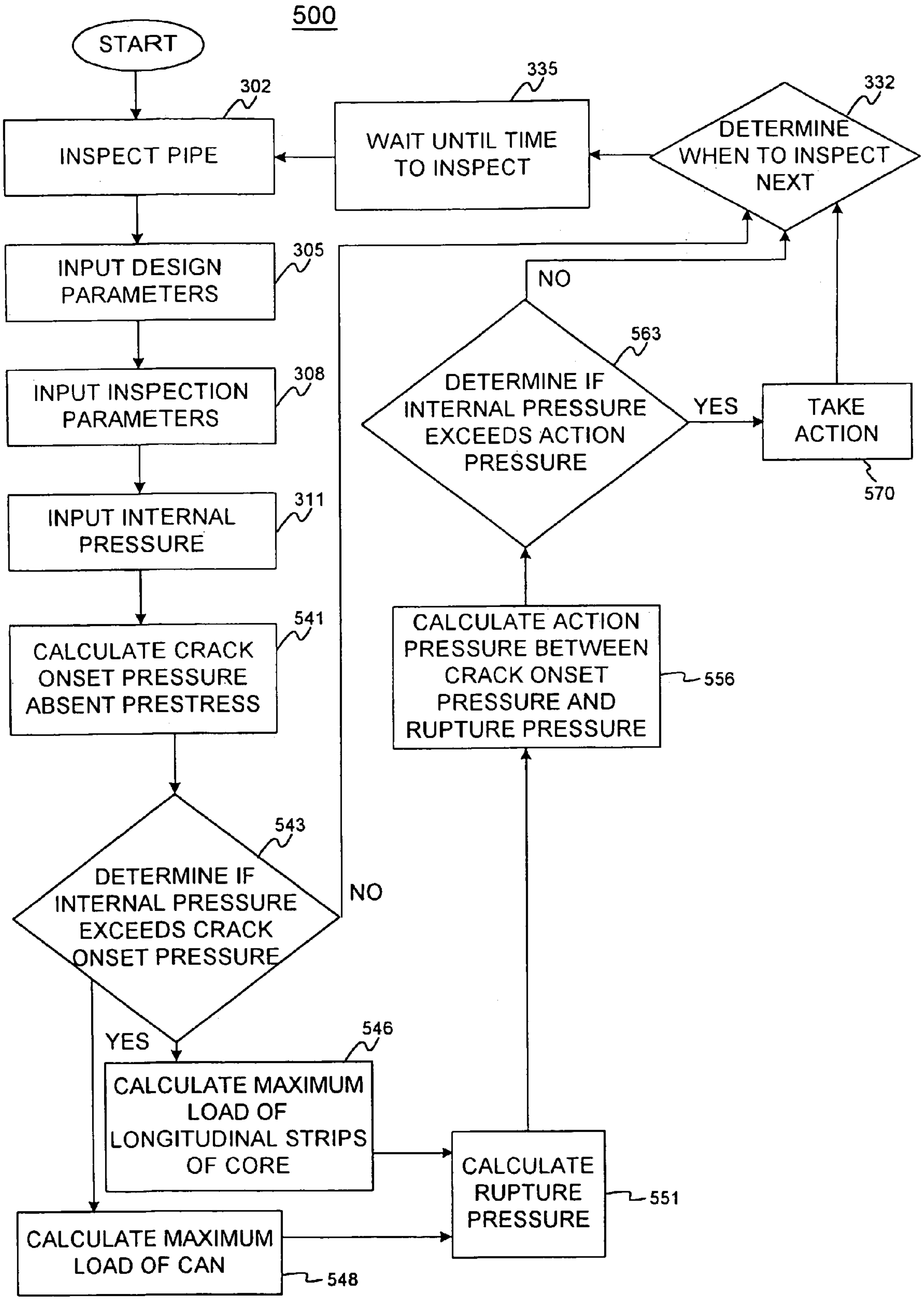
FIG. 5 is another flow chart illustrating the steps of another exemplary embodiment of a method in accordance with the present invention.
Figure 6:
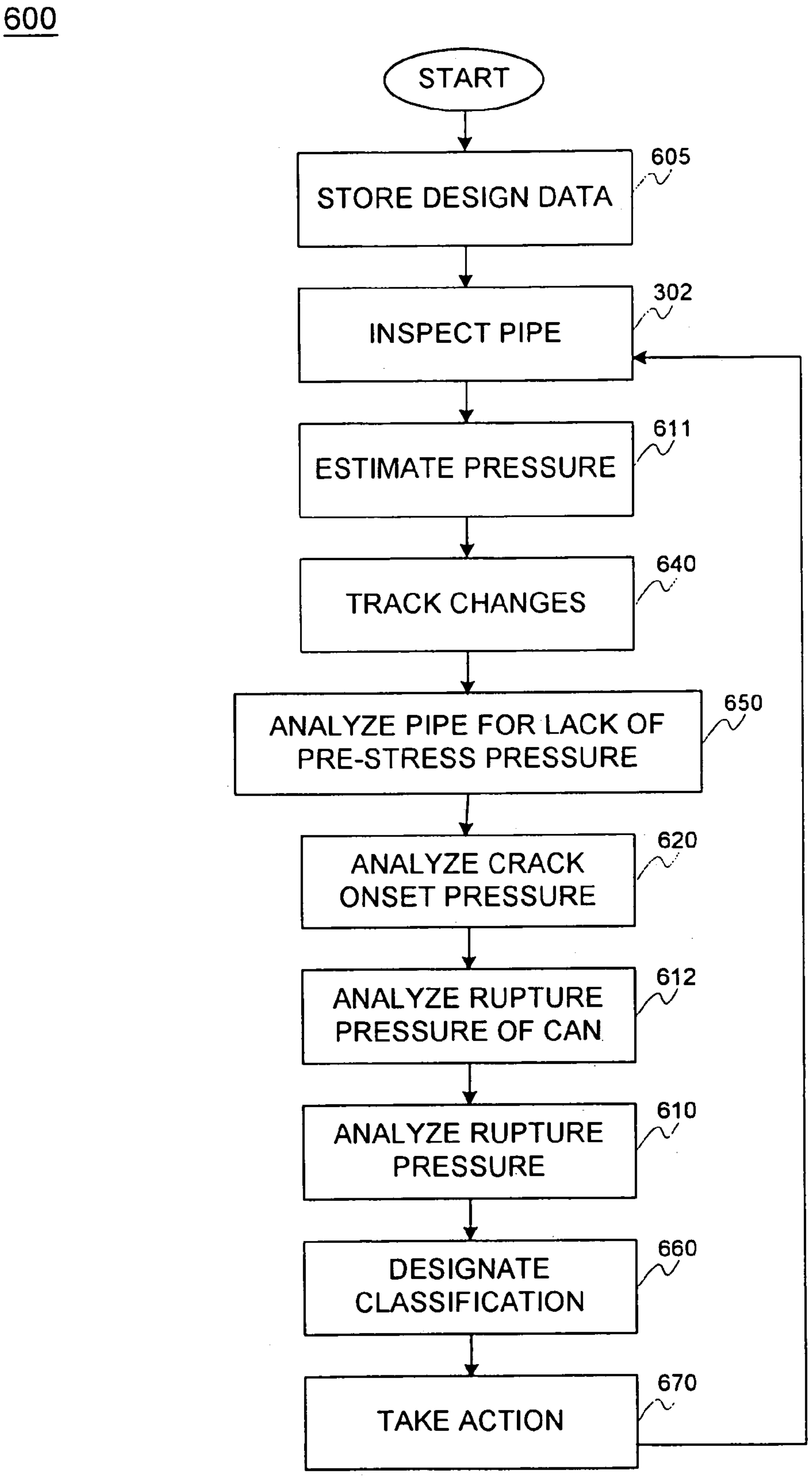
FIG. 6 is another flow chart illustrating the steps of a further exemplary embodiment of a method in accordance with the present invention.

Turning now to exemplary methods, FIGS. 3, 5, and 6 are flow charts illustrating various steps of various embodiments of the present invention. Embodiments of methods in accordance with the present invention may contain, inter alia, steps from one or more of these drawing figures. In general, FIG. 3, illustrates input steps, pipe management action, and the decisions regarding which pipe management action to take. In comparison, FIG. 5 illustrates input steps, calculations, and the decisions made based on those calculations. In further comparison, FIG. 6 illustrates input steps, analyses, and various other intermediate steps such as tracking changes.

Specifically, FIG. 3 illustrates an exemplary embodiment of a method in accordance with the present invention, which depicts, inter alia, a method of pipeline reliability management, for example, a method of determining or facilitating the determination of whether or when to take pipe management action such as repairing or replacing pipe. The pipe may be, for example, PCCP, although the present system and method 300 would generally work for other types of pipe, conduit, and ductwork, as well, which may be made of, as examples, concrete, welded steel, screwed steel, riveted steel, ductile iron, cast iron, plastic, copper, stainless steel, or aluminum bronze. Method 300 may include steps that are computer-implemented, (e.g., via processor 230 illustrated in FIG. 2) although some steps (e.g., replacing the pipe (step 324)) generally must be performed manually or by mechanical means and/or other means. Such external steps may not be part of embodiments of the present invention involving only the computer system. In addition, a computer simulation of pipeline systems and replacement of pipes may be part of the system and method.

Method 300 generally includes the steps of acquiring or inputting design parameters (step 305), inspecting the pipe (step 302), and acquiring or inputting inspection parameters (step 308). Although shown and described in the plural, in some embodiments only one design parameter or inspection parameter may be acquired or input. In other embodiments, multiple design parameters and inspection parameters may be acquired or input. Design parameters (e.g., as input in step 305) may include dimensions of the pipe, such as diameter, configuration, hydraulic performance, design loading, degraded pipe performance and/or the like. Other input data may include the diameter, thickness, and material strength of can 107, the diameter, thickness, and material strength of core 105, the wire size (e.g., diameter), spacing, tensile strength, and prestress tension of wire 111, the maximum operating pressure and anticipated transient pressure, the process fluid temperature and chemistry, and the pipe dead load (e.g., soil cover) and live load (e.g., road or railroad loading), and information related to the degradation rate of particular systems.

The inspection parameters (input in step 308) may include an evaluation of the structural integrity of the pipe, which, in the case of PCCP, may be the length or quantity of continuous or adjacent wire (e.g., wire 111 shown in FIG. 1) breaks within the section of pipe being analyzed. As used herein, a quantity of failed or broken wires may mean the actual number of wires broken or another value that is convertible to the actual number of wires broken, such as the length of pipe having adjacent broken wires. Further, a quantity of broken wires may include an effective value (e.g. an effective length as described in more detail below) where not all wires in a continuous portion of pipe have failed or are broken.

The inspection from which the inspection parameters (of step 308) are derived may involve eddy current inspection, ultrasonic inspection, visual inspection, sounding, acoustic monitoring, or other methods, which may be known in the art. FIG. 3 also shows the step of acquiring or inputting internal pressure 311, which may be either a design parameter or an inspection parameter depending on various factors including whether the design pressure is still the best information available. The maximum future pressure within the pipe may be estimated considering design data, field conditions, and planned use. However, the internal pressure (of step 311) could be based only on design data or historical measured pressure, for instance, the maximum pressure measured to date in service similar to that anticipated. The steps of acquiring or inputting design parameters (step 305), and acquiring or inputting inspection parameters (step 308) may include acquiring or inputting one or more environmental parameters or conditions specific to the site. These may include the amount of moisture or pH of the soil, etc.

Program inputs or parameters (e.g., 201–207 in FIG. 2) may originate from a piping design review (e.g., for step 305 in FIG. 3) and inspection (e.g., step 302 in FIG. 3), and the system (e.g., 200) or method (e.g., 300) may result in various outputs (e.g., recommended action 260). The piping design review (e.g., for step 305 in FIG. 3) may involve gathering various design data, which may already exist within drawings, specifications, and other documentation typically kept for pipelines. An understanding of the design, installation and construction of the pipeline may be helpful as a baseline for a pipeline reliability management determination. A typical review may consider the pipeline and control systems (including cathodic protection, if any), interconnected/adjacent systems, the fluid or gases conveyed by the pipeline, and the pipelines environmental conditions. One area that may be reviewed is the configuration of the pipeline. The original design, manufacture and installation drawings/specifications and field observations may be used to establish the materials of construction, diameter, and unit length for each spool or section of the pipeline. Where applicable, this data may be entered into the computer or processor (e.g., 230 in FIG. 2) and may be verified. Another area that may be reviewed is the hydraulic performance of the pipeline. The hydraulic performance characteristics (i.e., operating pressures, temperatures as a result normal/abnormal design conditions) of the pipeline may be reviewed, verified, and where applicable, entered into the computer (e.g., processor 230 in FIG. 2) for each corresponding pipe spool (i.e., section of pipe or unit length).

A further area that may be reviewed (e.g., for step 305 in FIG. 3) is design loading. Live and dead loads on the pipeline may be documented, which may include soil cover, roads and railroads, seismic conditions (e.g., earthquake loads), etc. An even further area that may be reviewed is the performance of pipe that has undergone degradation. A design review/study may be performed to determine how the piping system will perform under design loading with varying degrees of degradation. Specifically, an understanding of the failure progression for the pipe may be needed. As an example, prestressed concrete cylinder pipe (PCCP) may be analyzed to determine the amount of loss of prestressing wires (e.g., 111 in FIG. 1), concrete core (105) cracking, or loss of steel cylinder (can 107) thickness that can be withstood for a given system design and pressure. Similar engineering reviews for ductile iron or steel pipe may model wall thickness reductions in terms of area, minimum wall thicknesses, and corrosion allowances. Results of such a review may be expressed in numerical terms (e.g. number of broken wires 111, minimum wall thickness, minimum design, corrosion allowance per year, etc.) which in computer implemented embodiments may be entered into the computer (e.g., processor 230 in FIG. 2) for each spool or section.

The second type of data or program inputs to the system and method of pipeline reliability management are the result of inspection (e.g., inspection parameters of step 308 shown in FIG. 3). Various methods have been developed to inspect (e.g., step 302) the various types of pipe to evaluate the integrity or extent of physical degradation of the pipeline. Some of these methods are described above, including, as examples, eddy current, ultrasonic, visual inspection, sounding, and acoustic monitoring. The application to different pipelines may be selected based on access, materials of construction, and cost. In embodiments where a computer or processor (e.g., processor 230 in FIG. 2) is used, results of the above inspections may be input into the computer or processor. As an example, in addition to applications of the above inspection techniques with PCCP, UT could also be used for reliability evaluation of metallic piping systems. In the exemplary embodiment of use with PCCP, wire break numbers and locations may be entered into the computer or processor (e.g., processor 230) for each spool or section of pipe. RFEC techniques may also be used to measure wall thinning in metallic pipe, such as 12-inch ductile iron fire protection piping. These values/degradation parameters could also be input to the computer or processor (e.g., processor 230) for reliability evaluation of ductile iron piping systems.

Still referring to FIG. 3, in the exemplary embodiment illustrated, after the data input steps (input parameters of steps 305, 308, and 311), the data may be analyzed (as described below) (e.g., by processor 230 shown in FIG. 2), and the output may include one or more recommended options regarding corrective action, or action to manage the pipe or pipeline. The output may include, for example, whether to replace (step 314), repair (step 317), or monitor (step 319) the pipe. The output may involve, for instance, each section or spool of pipe (e.g., each bell and spigot section), or larger sections of pipe, up to the entire pipeline. Although these three options are shown in method 300, embodiments of the present invention may have fewer, more, or different options for pipe management action.

Taking a closer look at the pipe management actions illustrated in FIG. 3, method 300 illustrates and may include the steps of replacing the pipe (step 324), repairing the pipe (step 327) or monitoring the pipe (step 329). Method 300 illustrates and may also include the steps of determining when to inspect the pipe (e.g., 100) next (steps 332 and 339), and either monitoring the pipe (step 329) or simply waiting until it is time to inspect the pipe again (step 335). Replacing the pipe (step 324) may involve replacing with the same kind or a different kind of pipe (e.g., replacing PCCP with steel pipe or cast-in-place).

Determining when to inspect next (step 332), may involve making a determination of how quickly the pipe is deteriorating, (e.g., a degradation rate). The degradation rate may be determined from the difference in condition of the pipe between at least two successive inspections performed at different times. For instance, methods of extrapolation may be used, which may be commonly known. The degradation rate may be used not only to determine when to inspect the pipe next, but may also be used to estimate or forecast when the pipe will need to be or should be repaired or replaced. This estimate may be used to determine when funding, manpower, or equipment will be needed, or otherwise to plan the work. In the alternative, a degradation rate may be assumed rather than determined for a particular pipe, and when the pipe will need to be or should be repaired or replaced may be determined from the assumed degradation rate and the results of one inspection.

Repairing the pipe (step 327) may involve installing post tensioned tendons around the outside surface 122 of pipe 100, installing a steel liner within the inside surface 102 of pipe 100, or other methods of repairing pipe, including those known in the art. Post tensioned tendons may comprise wire rope, which may be installed within a polymer sleeve to protect the wire rope from corrosion. The sleeve may further contain a corrosion inhibiting material or grease. However, a possible disadvantage of this repair method includes the need to excavate all the way around the pipe (e.g., pipe 100), which may need to be done for each tendon at a time below spring-line, in order to install post tensioned tendons. Once excavated, the tendon may be wrapped once around the pipe, and then tensioned (e.g., to replace the lost prestress). The excavation may require hand excavation to avoid damaging the pipe, and may be labor intensive and expensive. However, it may be possible to do it while the pipeline is in service, and it may be considerably less expensive than replacing the entire pipeline.

In contrast, repairing pipe (step 327 of FIG. 3) by installing a steel liner may involve taking the pipe out of service for an extended period of time to install the liner, and may involve extensive field welding and grouting between the liner and interior 102 of pipe 100. In addition, a liner ultimately results in a reduction of the inside diameter of the pipe, which may reduce capacity or increase the pumping energy required for a given flow. Further, a protective coating, such as coal tar epoxy or cement mortar, may need to be applied and maintained on the steel liner to protect it from corrosion.

Whether a pipe is repaired or replaced may depend on how may spools or sections of pipe are in a seriously distressed condition, the importance of the pipeline, whether funding is available now, the time value of money, and other factors. It may be less expensive to replace a pipeline than to repair the entire pipeline; however, if areas of distress can be consistently identified prior to failure, considering the time value of money, it may be less expensive to repair a portion of a pipeline each year for an extended period of time than to incur the up-front cost of replacing the entire pipeline. Monitoring the pipe (step 329) may involve installing and using an acoustic monitoring system (e.g., as described above) or inspecting the pipe frequently.

Figure 4:
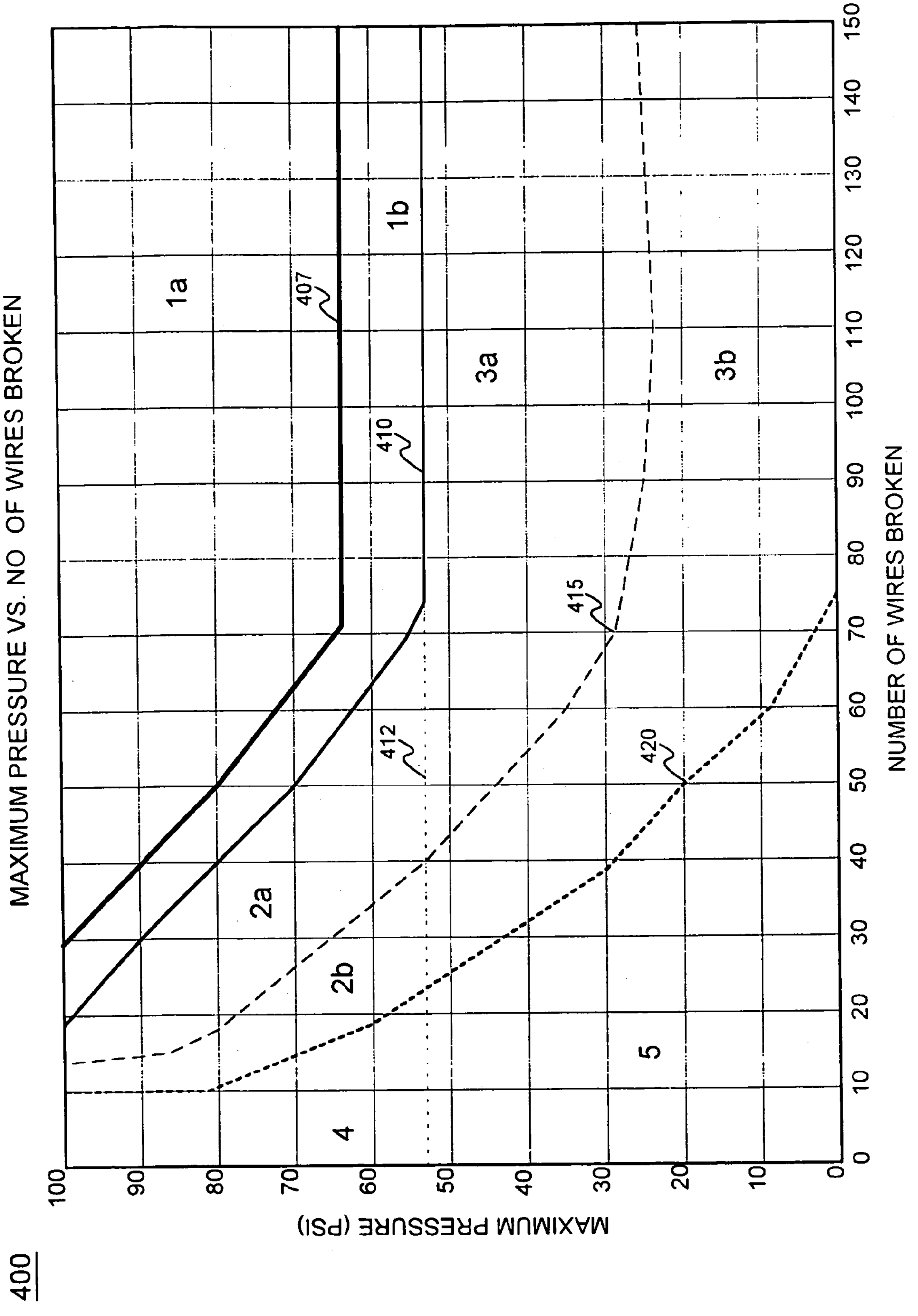
FIG. 4 is a graph of pressure versus number of wires broken, illustrating various aspects of an exemplary embodiment of the present invention.

The analysis of the present invention (e.g., of method 300) may involve using a graph 400 or relation of pressure versus a quantification of the structural integrity or the degradation of the structural integrity of the pipe, an example of which is illustrated in FIG. 4, and is described in more detail below. Although graph 400 is depicted in FIG. 4 as being physically viewable, as would be apparent to one skilled in the art, a relation may be used in the present invention that is, for instance, embedded within a computer program and may not be readily viewable. Thus, the zones or curves (such as shown in graph 400) may be defined by equations, look-up tables, or the like. Further, as used herein, a relation may be embedded within a computer program and may not be readily viewable, or may be a physically viewable graph such as graph 400. For the sake of explanation herein, a viewable graph 400 is described. However, the characteristics described for graph 400 may apply to a relation in various embodiments of the present invention.

The relation or graph (e.g., 400) may have at least zones of high risk (e.g., 1*a* and 1*b*) and low risk (e.g., 4 and 5). Further, the relation or graph (e.g., 400) may include additional zones of intermediate or medium risk (e.g., 2*a*, 2*b*, 3*a*, and 3*b*). Thus, the various zones may have higher risk or lower risk, e.g. relative to each other. For instance, on graph 400, the higher the number of the zone, the lower the risk. The boundaries of these zones (e.g. the curves shown on graph 400), among other factors in the analysis, may be refined over time based, for example, on failures in service and destructive or non-destructive testing (e.g., of pipe that is designated for replacement). Thus, the determinations of whether to replace (step 314), repair (step 317), or monitor (step 319) the pipe may include the step of testing the method over time to refine the accuracy of the method.

Referring generally to FIGS. 1–5, once the necessary information is obtained or input into a computer or processor (e.g., processor 230 in FIG. 2), the data may be analyzed in accordance with various aspects of the present invention. One step may be to analyze or calculate the rupture pressure of the pipe (step 551). In the example of PCCP, the analysis of rupture pressure may involve considering a loss of prestress (wire 111 failure) extending over a significant part of the pipe 100. To do so, the core 105 may be modeled as a long cylindrical shell subjected to the effective external pressure of prestressing, and the anticipated maximum pressure (e.g., of step 311) within the pipe. In the case of a liquid fluid, such as water 106, the maximum pressure within the pipe (internal pressure) may include hydrostatic pressure, but may also include local dynamic effects such as surge or potential water hammer.

Referring still to FIG. 1, other external pressures such as soil loading or groundwater pressure may also be considered where applicable and ascertainable. Pipe weight and fluid weight may also be considered. These loads may produce bending in the pipe wall, but may not have a significant effect on the can 107 after cracking of the core 105. In some cases, thrust effect of external loading may be considered, although they may be small relative to internal pressure. In more sophisticated embodiments of the present invention, in addition to the foregoing effects, the effects of microcracking and cracking of the concrete core 105, and yielding and strain (work) hardening of the steel cylinder or can 107 may also be considered.

To perform the analysis or decide what pipe management action to take or recommend, the loss of prestress over the pipe's entire circumference may be simulated by removing the prestressing pressure around the entire circumference over a limited length of pipe 100. Using the loss of pre-stress and the maximum pressure within the pipe, the maximum circumferential stresses in the concrete core may be calculated. The maximum stress may be compared with the allowable stress for the degraded pipe (i.e., the pipe 100 with broken wires 111). For instance, the ultimate strength of the degraded composite structure (e.g., concrete core and steel cylinder or can 107, with no wires 111) may be determined. Allowable stresses may be set lower to provide a design or safety margin. In this way, risk of failure can be measured by how close actual stresses compare to allowable or ultimate stresses. Generally, all other things being equal, the closer actual stresses are to the ultimate stress, the higher the risk.

If the maximum circumferential stress in the core 105 exceeds the cracking strength, then it may be assumed that the core 105 cracks around pipe 100, resulting in softening (generally a significant reduction in strength in the circumferential direction) of core 105 around the entire circumference. However, since in this scenario can 107 is still intact and wire 111 is still intact nearby, the concrete core 105 can still resist the internal pressure, for example, by longitudinal strips of the core 105 loaded (as beams) in bending. (The analysis of these strips is performed in step 546 shown on FIG. 5 and described below.) Thus, in the case of PCCP, the steel cylinder or can 107 may increase the strength of the core 105. The tensile strength of the can 107 can be considered in the circumferential direction; however, the tensile strength of the can 107 may also increase the strength of the longitudinal strips of the core 105 loaded as beams in bending.

A loss of prestress may also exist over just a portion of the circumference of the pipe 100. As an example, such a localized loss of prestress may be modeled as being absent within an 11.25 degree angle. In this scenario, bending moments may develop along the termination points of prestressing, which may lead to cracking. The strength of the core 105 beyond the prestress-loss zone will prevent cracking if the length of such a zone is small, as may be analyzed and revealed by a finite element analysis. In addition, the analysis of the loss of prestress may be effected by whether the loss is at the end of a section of pipe 100, or somewhere in the middle.

Embodiments of the present invention may analyze the case in which there are multiple prestress loss zones or areas near each other, with a segment of intact prestressed wire 111 in between. If the segment of intact prestressed wire 111 in between is large enough (e.g., greater than 25 inches), then the two areas of prestress loss may be analyzed independently from each other. In such a case, the worst case scenario is the larger of the two lengths of prestressed loss, and there may be no reason to consider the shorter section. On the other extreme, if the segment of intact prestressed wire 111 in between is small enough (e.g., less than 3 inches), then the lengths of the two sections of prestress loss may be added together into one effective length. In addition, there may be an intermediate length of the segment of intact prestressed wire 111 between the two sections of prestress loss wherein an effective length of prestress loss may be given by a formula such as:

$$\text{effective length}=L2(0.6064-0.02424B)+L1(1.0754-0.00303B)$$

where L1 and L2 are lengths of the two area of prestress loss, L1>L2, and B is the length of the area of intact prestressed wire 111 in between the two areas of prestress loss.

As would be apparent to a person skilled in the art, the constants in the above equations, and the range of B for which the equations apply, may vary depending on the size and design of the pipe.

Returning to FIG. 4, in various embodiments of the present invention, different designs and sizes of pipe may be evaluated for rupture and cracking. For each pipe design, the length of the prestress loss and the magnitude of the internal pressure may be varied to calculate, for example, the maximum stress in the core 105. The relationship between prestress loss length and internal pressure may then be determined. The length of prestress loss, which may be readily convertible to the number of wire 111 breaks (and vice versa), may be plotted as a function of pressure that causes cracking or rupture. In one exemplary embodiment, separate relations or plots may be prepared and considered for prestress loss at the end of the pipe, and prestress loss in the middle of the pipe.

An example of a plot of pressure versus wires broken (graph or plot 400) is shown in FIG. 4, which illustrates a relation that may be computer implemented. Four curves (407, 410, 415, and 420) are shown on graph 400. In the embodiment illustrated, curve 410 indicates rupture, curve 420 indicates cracking onset, and curve 415 is located between curve 410 and curve 420, dividing the zone in between into repair priority zones, described in more detail below. Graph 400 also shows pressure 412, which may be essentially the rupture pressure of the steel cylinder or can 107 without the benefit of any prestressing wire 111 or concrete core 105 strength. The right hand portion of pressure 412 is in common with the right hand portion of curve 410 wherein a large number of wires 111 are broken. Thus, the condition of wire 111 may not be relevant for pipe operated at maximum anticipated pressures significantly below pressure 412, since can 107 may adequately withstand the pressure.

Referring further to FIG. 4, an exemplary embodiment of the present invention is a system or method of facilitating the management of a pipeline, such as determining whether or when to repair or replace pipe (e.g., PCCP) that involves using a relation or graph such as graph 400 of pressure versus a quantification of the degradation of the structural integrity of the pipe (e.g., 100). As mentioned above, the relation or graph 400 has repair priority zones of high risk (e.g., 1*a* and 1*b*) and low risk (e.g., 4 and 5), plus additional zones of intermediate or medium risk (e.g., 2*a*, 2*b*, 3*a*, and 3*b*). (However, other zones could be considered high, medium, or low risk, or higher or lower, e.g. relative to each other.) The quantification of the degradation of the structural integrity of the pipe may include, for example, determining the quantity of broken wires (111 shown in FIG. 1), and the pressure may be, for example, the maximum pressure anticipated in the pipe 100. In the exemplary embodiment shown, the relation or graph 400 further shows the pressure 412 for the ultimate strength of the cylinder or can 107. This may be the pressure at which the can 107 will rupture absent any prestressing force (e.g., from wire 111).

Still referring to FIG. 4, and occasionally to FIG. 1, the repair priorities or repair priority zones in the exemplary embodiment shown in FIG. 4 are as follows: Priority 1*a* is generally located where the expected maximum pressure exceeds by more than a predetermined amount, the rupture pressure of the composite pipe 100 given the number (or effective number) of wire 111 breaks that were found. Thus, priority 1*a* is generally located where the maximum pressure exceeds curve 407 for the quantity of wire breaks found during inspection. The predetermined amount may be, as examples, 10 percent of the rupture pressure (depicted by curve 410). Priority 1*a* is the highest priority or zone of highest risk shown on graph 400.

Priority 1*b* is generally located where the expected maximum pressure exceeds, by less than the predetermined amount, the rupture pressure of the pipe 100 given the number (or effective number) of wire 111 breaks that were found. In other words, priority 1*b* is generally located between curves 410 and 407.

Priority 2*a* is generally located where the expected maximum pressure exceeds the pressure that causes the concrete core 105 to crack (depicted by curve 420), by more than the amount delineated by curve 415, but is generally below the rupture pressure of the pipe 100 (the rupture pressure depicted by curve 410) given the number (or effective number) of wire 111 breaks that were found. Priority 2*a* is generally located between curves 415 and 410, and above (can 107 rupture) pressure 412 (of the composite pipe 100).

The action pressure or curve 415 may be generally located, as an example, halfway between the onset of core 105 cracking (curve 420) and rupture pressure (curve 410). However, the action pressure or curve 415 may be located higher or lower for various applications, as may be determined by experience. For instance, if experience shows that pipe sections just below curve 415 often fail in service, then it may be advisable to lower curve 415 so that such pipe sections are classified in a higher repair priority and are then repaired or replaced before they fail. On the other hand, if pipe sections designated for replacement are hydrostatically tested to failure, and it is found that they consistently fail far above curve 415, then it may be advisable to raise curve 415 such that sections of pipe are classified in a lower repair priority to avoid the unnecessary expense of repairing or replacing sections of pipe that are fit for service. In addition, although only one curve 415 is shown, additional action pressures or curves defining additional priority zones or classifications may be utilized, as would be apparent to a person of skill in the art.

Continuing to refer to FIG. 4, in the exemplary embodiment illustrated, priority 2*b* is generally located where the expected maximum pressure exceeds the pressure that causes the concrete core (e.g., core 105 shown in FIG. 1) to crack, by less than the amount delineated by curve 415, and is further less than the rupture pressure of the pipe 100 given the number (or effective number) of wire 111 breaks that were found. Priority 2*b* is located between curves 420 and 415, and above pressure 412.

Priority 3*a* is generally located where the expected maximum pressure exceeds the pressure that causes the concrete core 105 to crack, by more than the amount delineated by curve 415, but the expected maximum pressure is less than the rupture pressure of the pipe 100 given the number (or effective number) of wire 111 breaks that were found. Priority 3*a* is generally located between curves 415 and 410, and below pressure 412.

Priority 3*b* is generally located where the expected maximum pressure exceeds the pressure that causes the concrete core 105 to crack, by less than the amount delineated by curve 415, and is therefore significantly less than the rupture pressure of the pipe 100 given the number (or effective number) of wire 111 breaks that were found. Thus, priority 3*b* is generally located between curves 420 and 415, and below pressure 412.

Priority 4 is generally located where the expected maximum pressure is less than the pressure that causes the concrete core 105 to crack (and is therefore much less than the rupture pressure of the pipe) given the number (or effective number) of wire 111 breaks that were found. Priority 4 is generally located to the left of, or below, curve 420, and is above pressure 412. Priority 4 is the zone in which PCCP is typically designed to operate.

Priority 5 is generally located where the expected maximum pressure is less than the pressure that causes the concrete core 105 to crack (and is therefore much less than the rupture pressure of the pipe) given the number (or effective number) of wire 111 breaks that were found. Priority 5 is generally located to the left of or below curve 420, and is below pressure 412. Priority 5 is the lowest risk zone shown on graph 400.

Generally, the lower the number of the priority zone described above, the greater the risk or urgency that pronounced action be taken in the management of the pipe 100 such as repairing (step 327 in FIG. 3) or replacing (step 324 in FIG. 3) the pipe 100. Zones 2*a* and 2*b* are considered to be a higher priority than zones 3*a* and 3*b* because additional wire 111 breakage will theoretically not lead to pipe 100 failure in zones 3*a* and 3*b* since the anticipated maximum internal pressure is less than the pressure required to rupture the can 107 absent any prestressed wires 111. Although cracking of core 105 may allow water 106 to leak into can 107, it has been found that corrosion of the embedded steel cylinder or can 107 may be a very slow process, even if the concrete core 105 is cracked. However, embodiments of the present invention may take into consideration deterioration of can 107 such as via corrosion. This may be particularly important where the pipe is operated for a long time below (can 107 rupture) pressure 412 (e.g. in zones 3*a* or 3*b*).

Returning once again to FIG. 2, the analysis or program outputs or recommended action 260 may include tracking the condition of the pipe. In embodiments where a computer or processor 230 is used, the computer or processor 230 may store design, configuration, and repair history for the pipeline, which may be input (at least at one time) as parameters (e.g., 201–207, for example, via step 305 shown in FIG. 3). This may include design information (e.g., step 305) and as-built conditions for the piping system, and may be useful in outage and emergency situations where rapid and accurate feedback may be essential. The computer (processor 230) may also predict trends such as considering the element of time-related degradation rate. As an example, the computer or processor 230 may calculate the time interval that may be used to predict when a degraded pipe spool or section will enter the next zone of risk, classification, or repair priority, using the following algorithm:

$$\begin{aligned}\text{TIME INTERVAL TO ENTER REPAIR PRIORITY } X &= \frac{\text{WB INCREASE NEEDED TO ENTER PRIORITY } X}{\text{RATE OF WB INCREASE PER UNIT TIME}} \\ &= \frac{(xWBT - GWB)}{WB \text{ CORROSION RATE PER UNIT TIME}}\end{aligned}$$

where:

$WB$ = number of wire breaks $xWBT$ = wire break threshold, i.e., the number of wire breaks it takes to enter repair category $X$. (from engineering review of prestress concrete cylinder structural performance data, and pipe management risk assessment).

$GWB$ = governing wire break, i.e., the number of wire breaks used to determine repair priority $X$. (from engineering review of remote field eddy current data).

The computer or processor 230 may also output repair prioritization, operating methods, design, maintenance and repair alternatives, or some combination of these.

Referring primarily to FIG. 5, a further exemplary embodiment of the present invention is a method 500 of managing or facilitating the management of pipe (e.g., pipe having a plurality of sections of PCCP). Method 500 may include, for example, the steps of inspecting the pipe (step 302), acquiring or inputting design parameters (step 305) acquiring or inputting inspection parameters (step 308), and acquiring or inputting the internal pressure (step 311), which may be an estimated maximum pressure that is likely to exist in future service as described above. All or part of the step of acquiring or inputting design parameters (step 305) may be performed before the inspection of the pipe (step 302), and once the design parameters are acquired or input (step 305), it may not be necessary to repeat this step when additional inspections (step 302) are performed in the future. Method 500 may also include the step of calculating the crack onset pressure (e.g., of core 105), for instance, absent any prestress (in wire 111). This step is also described above.

In the example of Method 500, a determination may then be made whether the internal pressure (input in step 311) exceeds the crack onset pressure (calculated in step 541) (step 543). If not, then the risk of pipe failure is fairly low (zones 3*a*, 3*b*, or 5 shown in FIG. 4), and in the exemplary embodiment depicted in FIG. 5, no further action is taken other than to determine when to inspect the pipe again (step 332), and to wait until it is time to perform the next inspection (step 335). However, as would be apparent to a skilled artisan, in other embodiments, other action may be taken, which may include further analysis and classification into zones 3*a*, 3*b*, or 5 shown in FIG. 4.

If the internal pressure exceeds the crack onset pressure (as determined in step 543), then FIG. 5 shows the steps of calculating the maximum load of the longitudinal strips of the core 105 (step 546) (the analysis of the strips was described in more detail above). If the internal pressure exceeds the crack onset pressure (as determined in step 543), then in the case of PCCP, the maximum load of the can 107 is also calculated (step 548) (generally pressure 412 shown in FIG. 4). The maximum load of the longitudinal strips of the core 105 (calculated in step 546), and the maximum load of the can 107 (calculated in step 548) may be used to calculate the rupture pressure of the pipe (step 551), as described above. The rupture pressure of the pipe (calculated in step 551) may, for instance, be a point on curve 410 illustrated in FIG. 4 for the corresponding number of broken wires (e.g., input in step 308).

In the next step shown in the exemplary embodiment illustrated in FIG. 5, the action pressure between the crack onset pressure (calculated in step 541) and the rupture pressure (calculated in step 551) is calculated (step 556). The action pressure between the crack onset pressure and the rupture pressure may be, for instance, the same or analogous to curve 415 shown in FIG. 4 and described above. Once the action pressure is calculated (step 556), a determination is made whether the internal pressure (input in step 311) exceeds the action pressure (step 563). If so, then in the exemplary embodiment depicted in FIG. 5, action is taken (step 570), e.g. pipe management action. This action (of step 570) may involve, inter alia, repairing, replacing, or monitoring the pipe, for instance, as described in more detail elsewhere herein. Pipe management action in this and other embodiments, may also (or in the alternative) include other activities such as making operational changes to reduce the pressure or flow rate in the pipe, adding devices or procedures to relieve or reduce surge or water hammer, constructing a back-up pipeline to be used if the original pipeline fails, stockpiling materials or equipment or arranging for properly skilled labor to be available in the event repair or replacement is needed, or initiating action to reduce the harm or damage that would be caused by a failure. Pipe management action may even further (or in the alternative) include doing nothing (as used herein, "doing nothing" may include undertaking no new pipe management action for the section of pipe, e.g. until the next time to inspect the pipe, but would generally not preclude initiating action that would have been taken anyway, such as using or cleaning the pipe), monitoring the pipe differently, inspecting the pipe sooner, initiating any of the above identified pipe management actions sooner, or other action that may be identified by a person of skill in the art.

In the exemplary embodiment depicted in FIG. 5, if the internal pressure (input in step 311) is less than the action pressure (compared in step 563), then the risk of pipe failure may be fairly low (zones 2*b* or 3*b* shown in FIG. 4), and no further action may be needed, other than to determine when to inspect the pipe again (step 332) and to wait until it is time to perform the next inspection (step 335). As would be apparent to a person of skill in the art, other embodiments of the present invention may involve other calculations and comparisons, for example, to differentiate between the various zones depicted in FIG. 4.

FIG. 6 illustrates, as a further exemplary embodiment, a method 600 of managing or facilitating the management of pipe or a pipeline, (e.g., PCCP). The present invention (e.g., Method 600) may be applied, for instance, to each section or spool of pipe (e.g., each bell and spigot section), or for larger sections of pipe, up to the entire pipeline. Method 600 may include the step of storing design data (step 605) for the pipe (e.g., pipe 100 shown in FIG. 1). The design data (of step 605) may include dimensions of the pipe 100, external loading on the pipe 100 and other design data described herein, for instance, with reference to step 305 of FIGS. 3 and 5. As an example, method 600 may involve a computer or processor (e.g., processor 230 shown in FIG. 2) which may store e.g., 100 design drawings, and data for 150 degraded PCCP spools or sections and 100 repaired PCCP spools or sections, or what is needed for storage for the particular application.

Still referring to FIG. 6, method 600 may also include the step of inspecting the pipe (step 302), which may be as described above, and may include an evaluation of the quantity of broken or failed wires (e.g., wires 111 shown in FIG. 1, for instance, within a predetermined length of pipe (e.g., pipe 100). The predetermined length may be, for example, one spool or section of bell and spigot pipe. However, shorter or longer predetermined lengths may be used, for instance, as would be conducive to inspection, repair, or other pipe management action. Method 600 may further include the step of estimating pressure (step 611) which may be the maximum pressure that will, or is expected to (e.g. is likely to), exist within pipe 100 in future service. The pressure (of step 611) may be the same or similar to the pressure of step 311 described above with reference to step 305 of FIGS. 3 and 5.

Method 600 may also include a step of facilitating a determination or designating a classification (step 660 (e.g., for the condition of the pipe). This step may involve using the design data for the pipe (e.g., stored in step 605), the quantity of failed wires (e.g., from step 302), and the maximum pressure (e.g., from step 611). The inspecting step (step 302) may be repeated at different times (e.g., along with other steps as shown in FIG. 6), and method 600 may include the step of tracking the condition of the pipe 100, such as tracking changes (step 640), for example, in the quantity of failed wires 111 over time. For instance, tracking changes (step 640) of method 600 may include calculating the rate of wire 111 failures, and predicting when pipe 100 will enter the next lower classification (designated in step 660) or zone (e.g., of risk as shown in FIG. 4 and described above with reference thereto).

Method 600 generally also includes the step of taking, initiating or implementing pipe management action (step 670) which may be based on the classification (e.g., of step 660) or zone (as shown in FIG. 4). Each classification (e.g., of step 660) may have a corresponding action (taken in step 670), which may be, as examples, doing nothing, monitoring the pipe, repairing the pipe, or replacing the pipe. Method 600 may involve two classifications, three classifications, or more (e.g., eight classifications corresponding to the eight zones shown in FIG. 4). As an example, if there are three classifications, the action corresponding to the first classification may be doing nothing, at least until the next inspection; the action corresponding to the second classification may be monitoring the pipe; and the action corresponding to the third classification may be repairing or replacing the pipe.

The parameters or criteria upon which the classification is determined (e.g., in step 660) may involve crack onset pressure (e.g., as described above, for instance, with reference to steps 541 and 543 in FIG. 5), rupture pressure (e.g., as described above, for instance, with reference to steps 551 in FIG. 5), the maximum load of the can (e.g., as described above, for instance, with reference to steps 548 in FIG. 5), or an intermediate action pressure (e.g., as described above with reference to steps 556 and 563 in FIG. 5), or other measurable or calculable parameters or criteria, including those described herein.

Still referring to FIG. 6, method 600 may further include the step of analyzing the pipe 100 for lack of prestress pressure (step 650). This analysis (of step 650) may be over the pipe's entire circumference and over a limited length of pipe 100, or it may be over just a portion of the pipe's circumference, and over a limited length of pipe. In addition, this analysis (of step 650) may include analyzing the pipe 100 for lack of prestress pressure over two limited lengths of pipe with a segment of intact prestressed wire 111 located between the first limited length and the second limited length. The segment with intact prestressed wire 111 may be, for instance, more than 3-inches long, and less than 25-inches long, and may involve using the formula described above. These analyses may be as described in more detail above.

Still referring to FIG. 6, method 600 may include the step of analyzing the rupture pressure (step 610), e.g., of the pipe 100 shown in FIG. 1. Thus, the step of designating a classification (step 660) may include determining whether the maximum pressure (e.g., estimated in step 611) exceeds the rupture pressure of the pipe (e.g., curve 410 shown in FIG. 4). Further, the step of designating a classification (step 660) may include determining whether the maximum pressure exceeds, by more than a predetermined amount, the rupture pressure of the pipe (e.g., exceeds curve 407 shown on FIG. 4).

Method 600 may even further include the step of analyzing the crack onset pressure (step 620) (e.g., of pipe 100 shown in FIG. 1). The step of designating a classification (step 660) may include determining whether the maximum pressure (e.g., estimated in step 611) is less than the rupture pressure (e.g., analyzed in step 610) of the pipe (e.g., pipe 100 shown in FIG. 1), and the maximum pressure exceeds the crack onset pressure (e.g., analyzed in step 620). Further, the step of designating a classification (step 660) may include determining whether the maximum pressure (e.g., estimated in step 611) is closer to the rupture pressure (e.g., analyzed in step 610) of the pipe (e.g., pipe 100 shown in FIG. 1), than to the crack onset pressure (e.g., analyzed in step 620), or vice versa. Even further still, the step of designating a classification (step 660) may include determining whether the maximum pressure (e.g., estimated in step 611) is less than the crack onset pressure (e.g., analyzed in step 620). Still further, method 600 may include the step of analyzing the rupture pressure of the can 107 (step 612), for instance, without any prestressing wire 111. Thus, the step of designating a classification (step 660) may include determining whether the maximum pressure (e.g., estimated in step 611) is less than the rupture pressure of the cylinder or can (e.g., pressure 412 shown in FIG. 4). In other embodiments, the step of designating a classification (step 660) may involve, inter alia, identifying any of the repair priority zones or zones of risk shown in FIG. 4, described herein, or known in the art.

Other variations and modifications of the present invention will be apparent to those of ordinary skill in the art, and it is the intent of the appended claims that such variations and modifications be covered. The particular values and configurations discussed above can be varied, are cited to illustrate particular embodiments of the present invention, and are not intended to limit the scope of the invention. It is contemplated that the use of the present invention can involve components having different characteristics as long as the elements of at least one of the claims below, or the equivalents thereof, are included.

What is claimed is:

1. A method of facilitating the management of a pipeline, the pipeline comprising at least a plurality of sections of prestressed concrete cylinder pipe, the method comprising, in any order, at least the steps of:

storing design data for each of at least a plurality of the sections, the design data comprising at least one dimension of each section;

inspecting at least a plurality of the sections, said inspecting comprising at least evaluating the quantity of failed wires within the sections;

estimating the maximum pressure that is likely to exist in future service within each of at least a plurality of the sections;

using at least the design data, the quantity of failed wires, and the maximum pressure, designating a classification for the condition of at least a plurality of the sections; and implementing pipe management action based on at least one classification.

2. The method according to claim 1, the design data further comprising at least external loading on at least one of the sections.

3. The method according to claim 1, said inspecting being repeated at different times, the method further comprising at least the step of tracking changes in the quantity of failed wires over time for at least a plurality of sections.

4. The method according to claim 1, each classification having a corresponding action, the method further comprising at least the steps of:

calculating the rate of wire failures for at least a plurality of the sections; and predicting when at least one of the sections will enter another classification.

5. The method according to claim 1, the action being selected from the group consisting of: monitoring the section, repairing the section, and replacing the section.

6. The method according to claim 1, each classification having a corresponding action:

the method comprising at least two classifications, the two classifications being a first classification and a second classification;

the action corresponding to the first classification being doing nothing to the section, at least until the next inspection; and the action corresponding to the second classification being selected from the group consisting of: repairing at least the section and replacing at least the section.

7. The method according to claim 1, each classification having a corresponding action:

the method comprising at least three classifications, the three classifications being a first classification, a second classification, and a third classification;

the action corresponding to the first classification being doing nothing to the section, at least until the next inspection;

the action corresponding to the second classification being monitoring at least the section; and the action corresponding to the third classification being selected from the group consisting of: repairing at least the section and replacing at least a plurality of adjacent sections.

8. The method according to claim 1 further comprising at least the step of analyzing at least one of the sections for lack of prestress pressure;

over the section's entire circumference; and over a limited length of the section.

9. The method according to claim 1 further comprising at least the step of analyzing at least one of the sections for lack of prestress pressure:

over just a portion of the section's circumference; and over a limited length of the section.

10. The method according to claim 1 further comprising at least the step of analyzing at least one of the sections for lack of prestress pressure:

over a first limited length of the section; and over a second limited length of the section;

a segment of pipe with intact prestressed wire being located between the first limited length and the second limited length.

11. The method according to claim 10:

the segment being more than 3-inches long;

the segment being less than 25-inches long; and the effective length of failed wires being a function of:

the first limited length, the second limited length, and the length of the segment.

12. The method according to claim 1 further comprising at least the step of analyzing the rupture pressure of at least one of the sections.

13. The method according to claim 12, the designating a classification comprising at least detennining whether the maximum pressure exceeds the rupture pressure of the section.

14. The method according to claim 12, the designating a classification comprising at least determining whether the maximum pressure exceeds, by more than a predetermined non-zero amount, the rupture pressure of the section.

15. The method according to claim 12 further comprising at least the step of analyzing crack onset pressure.

16. The method according to claim 15, the designating a classification comprising at least determining whether:

the maximum pressure is less than the rupture pressure of the section; and the maximum pressure exceeds the crack onset pressure.

17. The method according to claim 16:

the designating a classification comprising at least analyzing an action pressure;

the action pressure being less than the rupture pressure of the section;

the action pressure being greater than the crack onset pressure of the section; and the designating a classification comprising at least determining whether the maximum pressure is greater than or less than the action pressure of the section.

18. The method according to claim 17, the designating a classification comprising at least determining whether the maximum pressure is less than the rupture pressure of the cylinder.

19. The method according to claim 1:

said inspecting being repeated at different times, the method further comprising at least the step of tracking changes in the quantity of failed wires over time;

each classification having a corresponding action;

the method further comprising at least the steps of:

calculating for at least a plurality of sections the rate of wire failures, and predicting when a plurality of sections of the pipeline will enter a lower classification;

the method comprising at least two classifications, the two classifications being a first classification and a second classification;

the action corresponding to the first classification being doing noting, at least until the next inspection; and the action corresponding to the second classification being selected from the group consisting of: monitoring the section, repairing the section, and replacing at least a plurality of adjacent sections.

20. The method according to claim 19:

further comprising at least the step of analyzing at least one section for lack of prestress pressure;

over the section's entire circumference, and over a limited length of the section;

further comprising at least the step of analyzing at least one section for lack of prestress pressure:

over just a portion of the section's circumference, and over a limited length of the section;

further comprising at least the step of analyzing at least one section for lack of prestress pressure:

over the section's entire circumference, over a first limited length of the section, and over a second limited length of the section, a segment of pipe with intact prestressed wire being located between the first limited length and the second limited length.

21. The method according to claim 19:

further comprising at least the step of analyzing the rupture pressure of at least one section;

the designating a classification comprising at least determining whether the maximum pressure exceeds the rupture pressure of the section;

the designating a classification comprising at least the step of analyzing the crack onset pressure of the section; and the designating a classification comprising at least determining whether the maximum pressure exceeds the crack onset pressure.

* * * * *